United States Patent

[11] 3,545,407

| [72] | Inventor | William T. Moore |
| | | Rte. 4, Box 252, Minden, Louisiana 71055 |
| [21] | Appl. No. | 789,818 |
| [22] | Filed | Jan. 8, 1969 |
| [45] | Patented | Dec. 8, 1970 |

[54] ANIMAL PEN
6 Claims, 5 Drawing Figs.

[52] U.S. Cl. ............................................. 119/20,
119/155; 256/19
[51] Int. Cl. ........................................... A01k 01/02
[50] Field of Search .................................... 119/20, 15,
155, 27, 98, 99; 256/19, 26

[56] References Cited
UNITED STATES PATENTS
| 1,330,404 | 2/1920 | Sommer | 119/20 |
| 2,050,527 | 8/1936 | Grabe | 119/155 |
| 2,279,840 | 4/1942 | Robinson et al. | 119/98 |
| 2,504,214 | 4/1950 | Miller et al. | 119/155 |
| 2,764,127 | 9/1956 | Newman | 119/20 |
| 3,002,493 | 10/1961 | Galamba | 119/20 |

*Primary Examiner*—Aldrich F. Medbery
*Attorney*—McLean, Morton and Boustead

ABSTRACT: An animal control pen by means of which a single operator can segregate one or more animals from a large group. A plurality of identical fence sections enclose a relatively large pen area. Animals entering the area are then urged to move in the desired direction by means of swinging gates which gradually reduce the area in which the animals are able to roam. A control chute directs the animals either into a small enclosed control area in which a single animal can be confined for the performance of various animal husbandry operations or to a loading platform from which the animals can be loaded onto a truck for shipment.

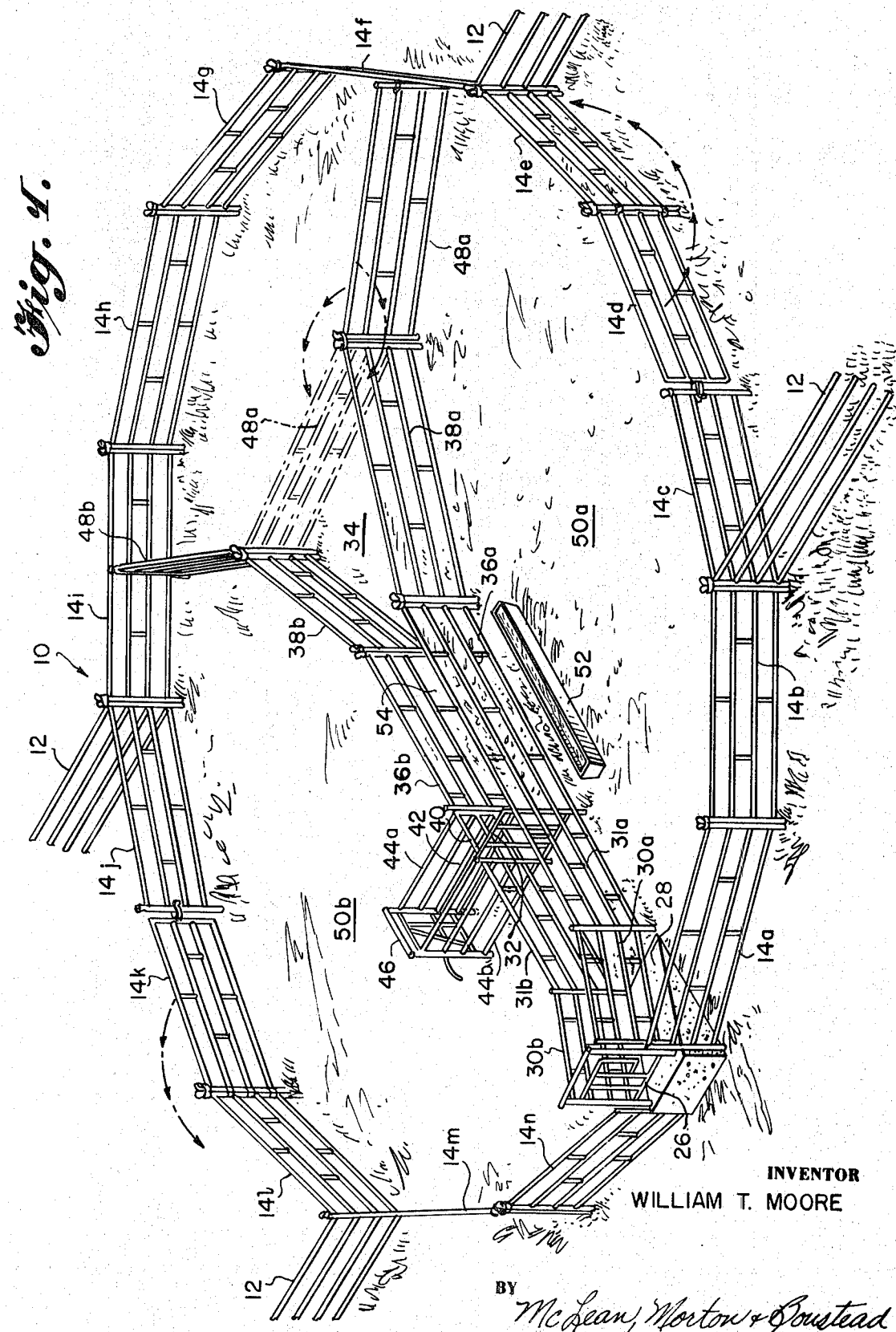

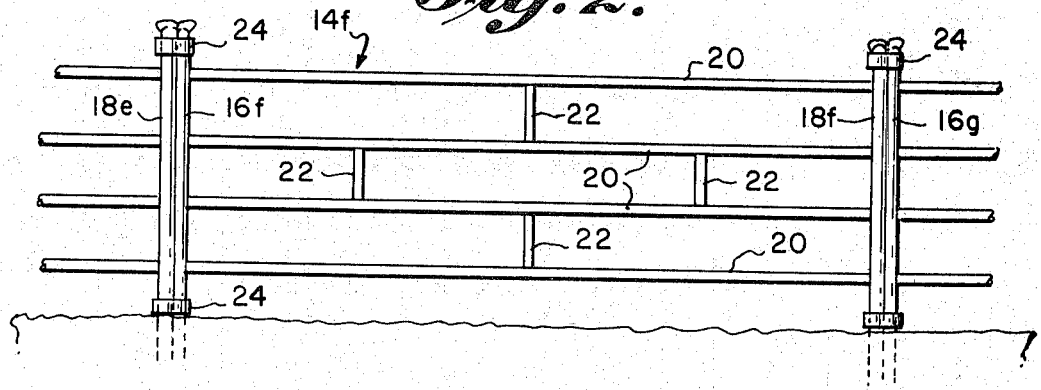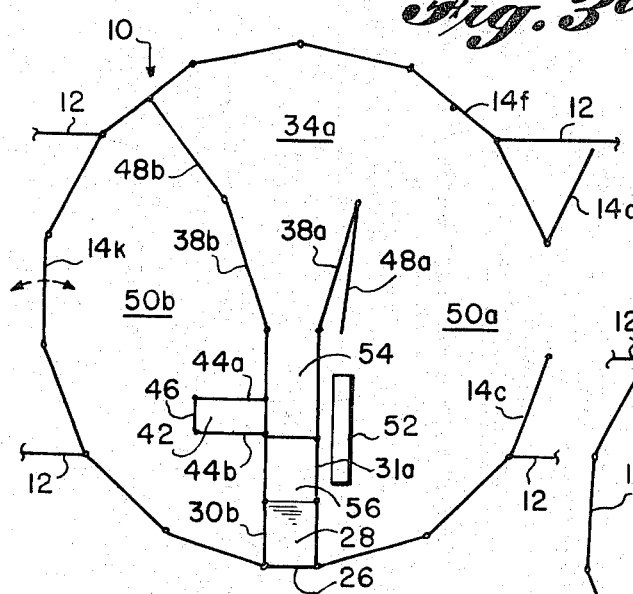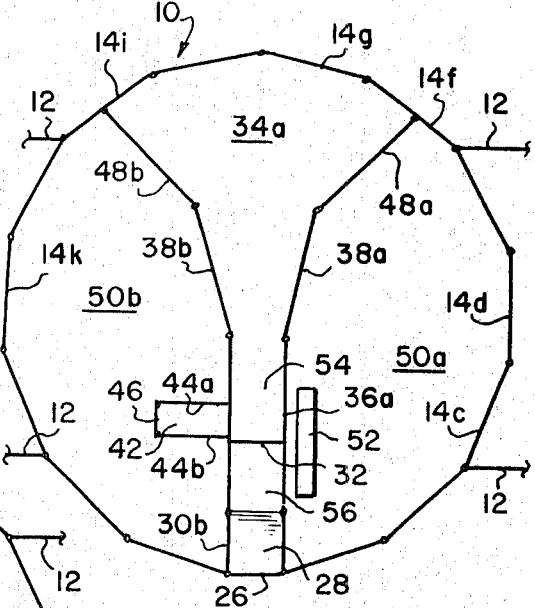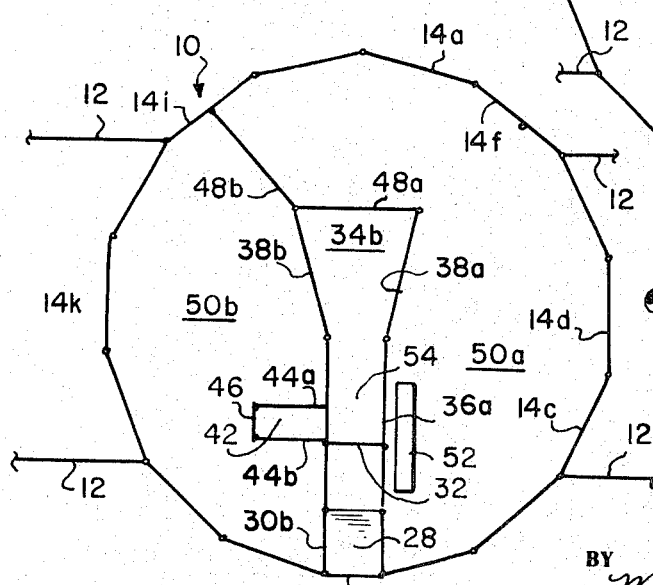

ANIMAL PEN

The present invention pertains to an animal control pen. More particularly, the present invention pertains to a pen in which animals can be segregated into small groups of one or more and kept under control during various necessary operations and by but one person.

In numerous animal husbandry operations it is necessary to isolate one or more animals from a large group or herd and to perform some operation on the segregated animals. By way of example, it may be desired to separate cattle by size or sex for shipment to different pastures or to market. Likewise, it might be desired to segregate particular cattle from a herd to be dehorned or to be sprayed for control of insects. Some of these operations such as spraying can be performed on a small group of animals, while other operations such as dehorning require complete separation of the animal to be worked on.

In general, presently available animal control pens require several persons to control the various gates within the pens and to urge the animals to move in the desired direction. This is undesirable not only because it is inefficient use of manpower but also because animals such as cattle tend to become alarmed by the presence of strangers and so must be driven into the pens. This upsets the animals and places great stress on the operators. In addition, many animals, such as cattle, are generally hesitant to enter a small enclosed area and so must be compelled to enter existing control pens.

The present invention is an animal control pen by means of which one operator can control a large herd of animals and can segregate them into small groups of one or more so that various necessary animal husbandry operations can be performed. The animal control pen includes a relatively large semienclosed area having moveable gates to fully enclose it and to reduce the area once the animals are within the pen so that the area in which the animals are free to move can be decreased gradually without alarming the animals. Using this animal control pen, a single operator can segregate one or more animals from the remainder of the group or herd and can isolate the segregated animals within a small area in which animal husbandry operations can be performed. If desired, the animals can be caused to leave the enclosed pen through a chute leading to a truck or other vehicle on which they can be transported to another desired location. Alternatively, the animals can be permitted to leave the pen through a gate to release them to another enclosed area, and the animals can then either be kept in that second enclosed area or they can be released to their pasture.

These and other aspects and advantages of the present invention are apparent in the following detailed description and claims, particularly when read in conjunction with the accompanying drawings in which like parts bear like reference numerals. In the drawings:

FIG. 1 is a perspective view of a control pen in accordance with the present invention;

FIG. 2 is an enlarged fragmentary view depicting details of fence sections, suitable for use in the control pen of the present invention; and FIGS. 3A, 3B, and 3C are plan views depicting operation of an animal control pen in accordance with the present invention.

Animal control pen 10 depicted in FIG. 1 is located upon fences 12 which might be a part of a cross fence or division between adjacent pastures. Control pen 10 has the shape of a polygon and by way of illustration is depicted as including around its periphery 14 similar fence sections 14a—14n. As depicted, sections 14d and 14k are hinged to their adjacent sections 14e and 14j, respectively to form moveable gates for the pen, while the remaining sections 14a —14c, 14e —14j, and 14l—14n are nonmoveable, being fixedly attached to each adjacent section. As shown in FIG. 2, each of the fence sections 14a —14n is formed of welded steel pipe and by way of example might have a length in the order of 12 feet and a height in the order of 6 feet. Each section includes two end posts 16 and 18 and four horizontal pipes 20. Adjacent horizontal pipes 20 are connected together by vertical pipes 22 which by way of example might have a length in the order of 1 foot. Each end post 16 and 18 is embedded in concrete beneath the surface of the earth, and adjacent end posts 16 and 18 are coupled together by coupling members 24. If, for example, each end post 16 and 18 is formed from a piece of steel pipe having an outside diameter of 1½ inches, then each coupling member 24 might be formed from two short pieces of steel pipe welded together and having an inside diameter 1½ inches. Once the coupling members 24 are placed over the end posts 16 and 18, these end posts can be crimped to prevent removal of the coupling members 24 and to prevent rain from collecting therein. Since the pen is constructed of these easily handled sections, each section can be welded together prior to movement of the pen to the field, and so no welding in the field is necessary. The pen can be assembled from these sections without any welding at the sight. Since the pen is assembled of such easily constructed sections, it is not necessary that the ground on which it is erected be level. Illustratively, pen 10 might have a cross section in the order of 60 feet, although any convenient size might be used in accordance with this invention.

Fence sections 14a and 14n are joined by sliding gate 26 while the second ramp side is bounded leads from inclined loading ramp 28. The first side of ramp 28 is bounded by fence section 30a and 31a, while the second ramp side is bounded by fence sections 30b and 31b each fence section 30a, 30b, 31a, and a 31b is of a construction similar to that of sections 14a —14n, but angled in accordance with the incline of ramp 28. If the angle is proper, then of course ramp 28 might extend the length of only one fence section, as depicted in FIG. 1. Ramp 28 might be formed of a concrete base covered with dirt upon it so that the cattle or other animals will readily walk up it. At the base of ramp 28 is another sliding gate 32 leading from a semienclosed area 34 of substantially funnel shape. Area 34 is bounded by fence sections 36a and 31b, which are in line with fence sections 31a and 31b, respectively, and by angled fence sections 38a and 38b which are angled outwardly from fence sections 36a and 36b, respectively. Another sliding gate 40 is located in side member fence section 36b adjacent gate 32 and leads from enclosed area 34 to a smaller control area 42 bounded on its sides by fence sections 44a and 44b, each of substantially the same design as fence sections 14. The outer end of area 42 is closed by head gate 46 of standard construction.

A swinging gate 48a has one of its ends hinged to the outer end of angled fence section 38a and is of a length which permits it to reach the outer edge of pen 10, for example at a point about in the middle of fence section 14f. Gate 48a can be locked in such a position with its outer end adjacent the outer pen fence.

Fence sections 38a and 38b are angled so that their outer ends are separated by a distance equal to the length of gate 48a, and gate 48a can be swung to and locked in a position joining sections 38a and 38b, as shown in broken lines in FIG. 1. A similar swinging gate 48b has one of its ends hinged to the outer end of fence section 38b and reaches the outer edge of pen 10, for example at a point about in the middle of fence section 14i, at which position it can be locked. Gate 48b likewise can be swung to and locked in a position joining sections 38a and 38b. The interior of control pen is thus divided into two sections 50a and 50b by the several fence sections 30a, 30b, 31a, 31b, 36a, 36b, 38a, 38b, and by gates 48a and 48b. Within pen section 50a and near fence section 31a is located a feed trough 52. A similar feed trough can be located within pen section 50b, if desired.

It has been found that by means of a control pen in accordance with the present invention a single operator is capable of controlling the movements of a large number of cattle and can confine them for performance of necessary operations or load them upon a vehicle for transportation. The animals have little freedom of choice as to their movements, and so cannot use their weight and speed to outmaneuver the operator. Operation of the animal control pen is illustrated in FIGS. 3A, 3B, and 3C. When it is desired to bring animals from an adjacent pasture into one side of the control pen, the entrance gate to that side is opened. Thus FIG. 3A depicts entrance gate section 14d open to permit animals to enter holding pen section 50a, while gate section 14k is closed. Gate 48b is in the position with its swinging end locked to posts 18h and 16i, while gate section 48a is swung back adjacent angled fence section 38a. The animals are moved toward open gate 14d and are enticed by feed within feed is and are enticed by feed within feed trough 52 to enter pen section 50a. Once the animals are within pen section 50a, gate 14d is closed, and gate 48a is slowly swung away from angled fence member 38. In general, animals such as cattle tend to move away from an advancing human, and so, as the operator swings gate 48a, the animals tend to move toward semienclosed area 34. Once fence section 48a has reached fence posts 18f and 16g, as depicted in FIG. 3B, the fence section can be locked in that position. If a large number of animals is to be treated, for example by spraying for insects, this can be done while the animals are held within the enclosed area 34a, as seen in FIG. 3B. If an operation is to be performed which necessitates the isolation of individual animals, or if the animals are to be loaded upon a truck for transporting, then preferably the animals are moved into area 34a in smaller groups and gate 48a is rotated to the position depicted in FIG. 3C so that the animals are confined within enclosed area 34b which is quite small. The lead animal enters chute 54 which preferably has a width in the order of 2 to 2½ feet so that it can accommodate a large animal but so that a small animal such as a calf cannot turn around in it. If an operation such as dehorning is to be performed, the horizontally sliding gate 40 is opened, inducing the animal to move into control area 42. Once the animal is within control area 42, its head can be secured in head gate 46, and the operation can be performed. Gate 46 is then opened to release the animal into pen section 50b. Once all of the animals have been processed through control area 42 they can be returned to their pasture, either by opening gate 14k or by opening gates 14d, 48a and 48b. If instead of an animal husbandry operation, the animals are to be loaded onto a vehicle for shipment, that vehicle is located adjacent gate 26 and horizontally sliding gates 26 and 32 are opened, inducing the animals to move up inclined loading ramp 28 and into the vehicle.

I claim:

1. An animal control pen comprising first means defining a first enclosed area and including first gate means for providing a closeable entrance to said first enclosed area; second means defining a semienclosed restraining area within said first enclosed area; second gate means having a first end and a second end, said second gate means first end hingedly connected to said second means to permit rotation of said second gate means thereabout, said second gate means having a length that during rotation permits reaching a first position in which said second gate means second end is adjacent said first means to form a second enclosed area from said semienclosed area and having means for moving and reaching a second position in which said second gate means second end is adjacent said second means to form a smaller enclosed area; third means defining an enclosed animal control area within said first enclosed area and including third gate means constituting a barrier that is openable between said animal control area and said semienclosed animal restraining area; and fourth means defining an animal loading chute and including fourth gate means selectively openable between said chute and said semienclosed area.

2. A control pen as claimed in claim 1 further comprising additional gate means having a first end and a second end, said additional gate means first end hingedly connected to said second means to permit rotation of said additional gate means thereabout, said additional gate means during rotation capable of reaching a first position in which said additional gate means second end is adjacent said first means to form another enclosed area from said semienclosed area and of reaching a second position in which said second gate means second end is adjacent said second means to form a further enclosed area from said semienclosed area.

3. A control pen as claimed in claim 1 in which said third means includes a head gate.

4. A control pen as claimed in claim 3 in which said fourth means includes an inclined ramp having said fourth gate means at the lower end thereof and having fifth gate means at the raised end thereof.

5. A control pen as claimed in claim 4 further comprising feed trough means within said enclosed area.

6. A control pen as claimed in claim 1 in which said first means comprises:

a plurality of substantially identical fence sections, each fence section including first and second vertical post members, a plurality of horizontal members, and a plurality of vertical support members joining adjacent horizontal members; and coupling means for coupling adjacent fence sections, said coupling means including a pair of substantially identical pipe pieces joined together in side-by-side juxtaposition, adjacent vertical post members passing through said pair of pipe pieces to couple adjacent fence sections together, said vertical post members having their upper ends crimped to prevent removal of said coupling means.